UNITED STATES PATENT OFFICE.

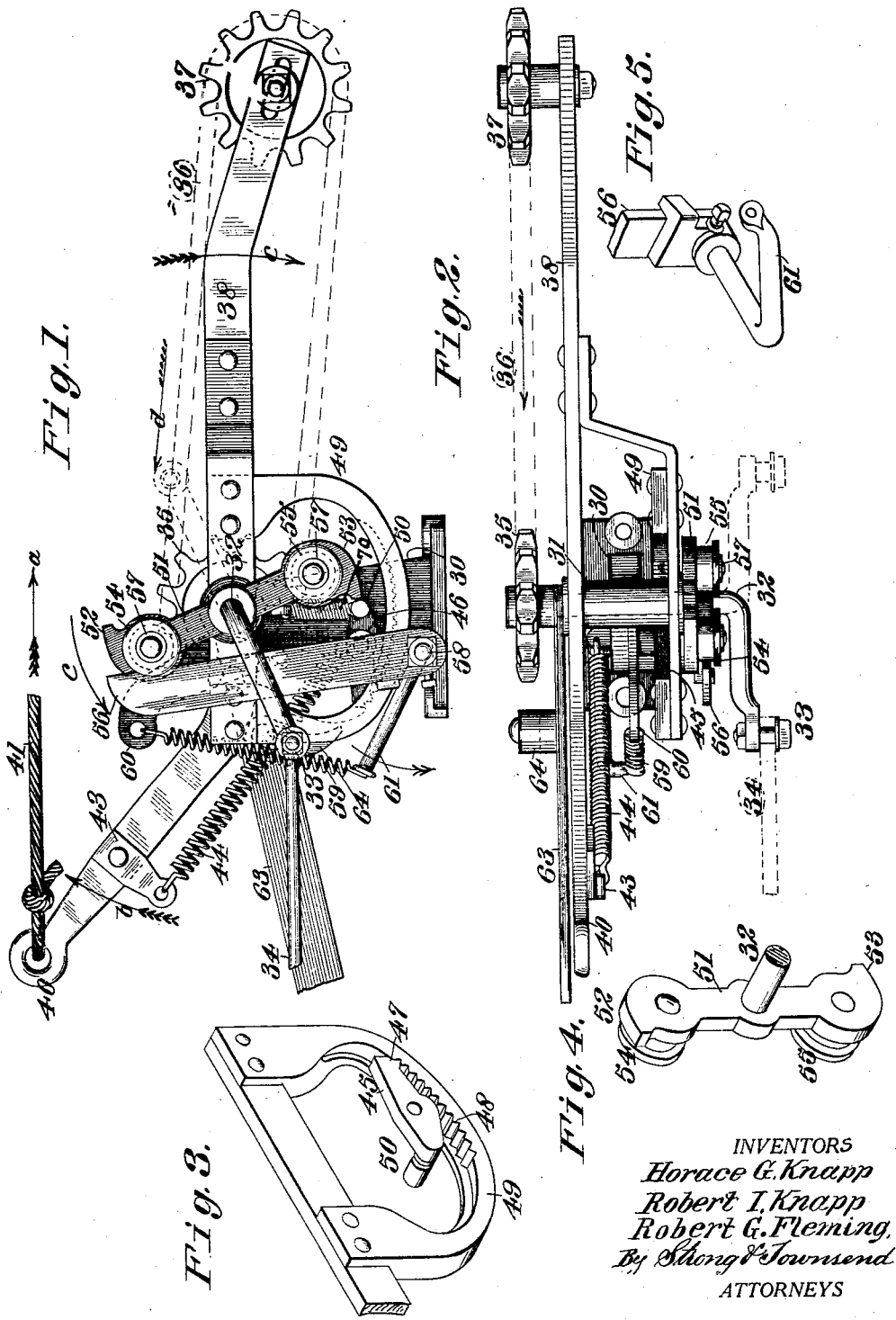

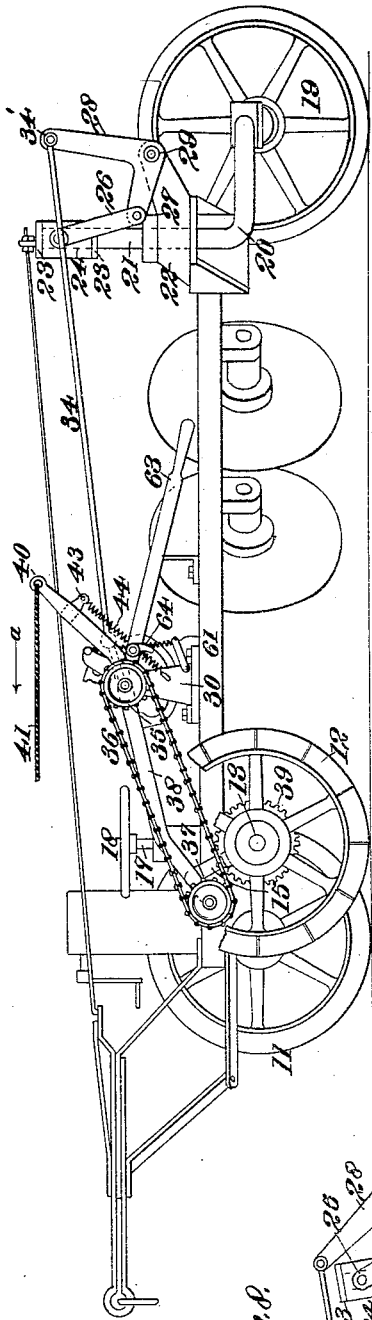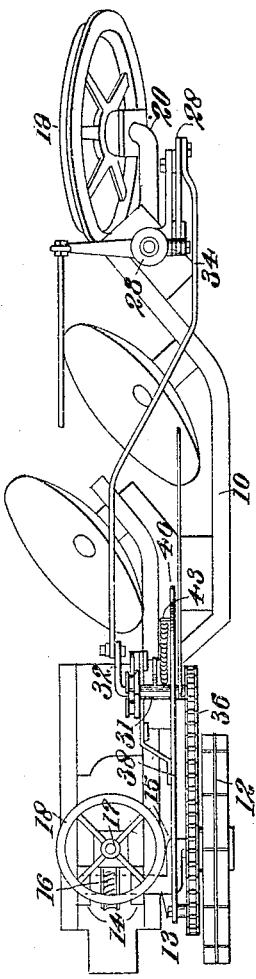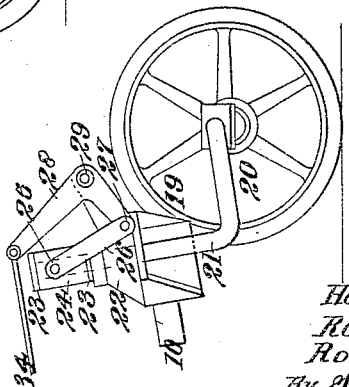

HORACE G. KNAPP, ROBERT I. KNAPP, AND ROBERT G. FLEMING, OF SAN JOSE, CALIFORNIA, ASSIGNORS TO THE KNAPP PLOW COMPANY, OF SAN JOSE, CALIFORNIA, A CORPORATION OF CALIFORNIA.

PLOW-LIFT.

1,364,439.           Specification of Letters Patent.          Patented Jan. 4, 1921.

Application filed June 4, 1919. Serial No. 301,671.

*To all whom it may concern:*

Be it known that we, HORACE G. KNAPP, ROBERT I. KNAPP, and ROBERT G. FLEMING, citizens of the United States, residing at San Jose, in the county of Santa Clara and State of California, have invented new and useful Improvements in Plow-Lifts, of which the following is a specification.

This invention relates to a lift for plows and particularly pertains to gang plows.

It is the principal object of the present invention to provide a lift for gang plows which may be easily controlled and will operate in a semi-automatic manner to lift and lower the plows as they are drawn and to further insure that the lifting or lowering operation will be automatically discontinued at the end of the operation desired.

The present invention contemplates the use of a plow lifting mechanism adapted to be mounted upon the frame of a gang plow and to be optionally thrown into operative relation to the rotating front wheels of the plow whereby power will be transmitted to the lifting mechanism and thereafter the frame lifted thereby.

The invention is illustrated by way of example in the accompanying drawings, in which—

Figure 1 is a view in side elevation showing the operative structure of the present invention drawn upon an enlarged scale and as disassociated from the plow frame.

Fig. 2 is a view in plan showing the invention as disclosed in Fig. 1.

Fig. 3 is an enlarged view of the locking mechanism of the power lift seen from the opposite side of the device as shown in Fig. 1.

Fig. 4 is a view in perspective showing the locking and releasing elements of the lift.

Fig. 5 is a view in perspective disclosing the spring traction member of the structure.

Fig. 6 is a view in side elevation showing a plow equipped with the present invention.

Fig. 7 is a view in plan showing the structure shown in Fig. 6.

Fig. 8 is a fragmentary view in side elevation showing the lowering mechanism used upon the rear end of the plow frame.

Referring more particularly to the drawings, 10 indicates the main frame, the forward end of which is supported upon side wheels 11 and 12. The wheel 11 is mounted upon a fixed axle secured to the main frame, while the wheel 12 is mounted upon a crank axle 13. This axle has a central horizontally extending portion carried in bearings 14 upon the main frame and the crank extension 15 extending alongside of the main frame and upon which the wheel 12 is rotatably mounted. The horizontal portion of the axle is fitted with a worm gear 16. This gear is in constant mesh with a suitable worm screw mounted upon a vertically extending shaft 17. The shaft 17 is carried by suitable main frame bearings and is fitted with a hand wheel 18 on its upper end. By this means the crank-shaped axle 13 may be rotated and the position of the wheel 12 changed with relation to the main frame while raising or lowering the main frame as the case may be.

The rear end of the main frame is supported by a trailer wheel 19. This wheel is mounted upon an axle 20 which carries an outwardly and downwardly inclining spindle and the horizontal portion formed integral therewith. At the forward end of this horizontal portion an upwardly extending shaft 21 is formed. This shaft passes through a bearing 22 carried at the rear end of the main frame and operates therewith to provide a swivel action for the rear wheel 19 to allow it to track as the plow is drawn forwardly. The vertical shaft portion 21 is formed with a pair of collars 23 between which a sleeve 24 is mounted. This sleeve is fitted with an outwardly extending stub shaft 25 to be engaged by a lifting link 26. The link 26 depends from the stub 25 and is pivotally connected by a pin 27 to a bell crank 28. The bell crank is pivoted at 29 to an extension arm of the bearing 22. By swinging the bell crank 28 about its pivotal center it is possible to slide the shaft 21 through the bearing 22 and thus raise and lower the main frame in relation to the wheel 19 and the ground.

The raising and lowering of the rear end of the main frame by means of the bell crank 28 and the linkage connected therewith is often accomplished by purely manual effort. In the present instance, however, it is intended that the movement of the plow will itself provide the necessary motive power to operate the bell crank 28 and produce the result desired. This is accomplished by the mechanism more particularly shown in Figs. 1 and 2 of the drawings where it will be seen that a standard 30 is made and is mounted upon the main frame. This standard carries a horizontal bearing 31 through which a crank shaft 32 extends. The crank end of this shaft is fitted with a bolt 33 securing a connecting rod 34 thereto. The other end of this connecting rod leads to the free end of the bell crank 28 and is there secured by a pin 34'. Thus it will be seen that by rotation of the crank shaft 32 the rod 34 will be reciprocated and the bell crank 28 oscillated. Rotation of the shaft 32 is produced by a sprocket 35 which is secured upon the outer end of this shaft and is fitted with a sprocket chain 36. The sprocket chain is led forwardly and around a second sprocket wheel 37. This wheel is mounted upon an axle parallel with the axis of the first main wheel, the axle being carried by a radius bar 38 which extends forwardly and is mounted to swing around the horizontal portion of the crank shaft 32. The length of the radius bar is greater than the distance from the sprocket wheel 35 to the axle 13 upon which the wheel 12 is mounted. This makes it possible for the downward swinging movement of the radius bar to bring the lower run of the chain into mesh with a driving sprocket 39 mounted upon the side of the wheel 12 and adapted to rotate therewith.

The radius bar 38 extends rearwardly and upwardly and forms an operating lever 40, which may be swung by a cord 41 leading to the tractor or to the point of control in advance of the plow. A lug 43 is secured or formed integral with the side of the lever 40 and is adapted to be engaged by a tension spring 44 leading downwardly and secured at its lower end to the standard 30. This spring will act to firmly hold the radius rod 38 in its uppermost position and the sprocket chain 36 out of engagement with the sprocket wheel 39.

The sprocket chain 36 is held in operative engagement with the sprocket wheel 39 after it has been swung downwardly by means of a pawl 45 which is mounted upon a pivot pin 46 secured to the side of the standard 30. This pawl is more clearly shown in Fig. 3 as having an end portion 47 adapted to engage a series of serrations 48 formed along the upper face of an arcuate bracket 49. This bracket is rigidly secured to the radius rod upon opposite sides of the rotating axis of the crank shaft 32. The face of the surface along which the serrations 48 are formed is concentric with the horizontal axis of the shaft 32. The opposite end of this pawl is formed with a trip pin 50 which extends outwardly and into the path of travel of a rotating trip member 51 secured integral with the shaft 32 and of course rotating therewith. This trip member is formed with opposite end cams 52 and 53, which will encounter the pin 50 at certain points in their cycle of revolution and will release the pawl.

The rotary member 51 is also provided with spool shaped extensions 54 and 55 which are adapted to normally rest against a lock lever 56. These members and their relation to each other and the rotary member 51 are particularly shown in Fig. 4 of the drawings. The grooved portions of the members 54 and 55 are adapted to provide seats for the side of the lock lever 56 and to stand with the rotary member 51 parallel thereto when the structure is in its inoperative position. The grooved extensions 54 and 55 are rotatable upon pins 57 which eliminate part of the friction due to the movement of the members in relation to each other. The lock lever 56 is pivoted for swinging movement from a pivot bolt 58 secured to the bottom portion of the standard 30. As the rotary locking member 51 is secured rigidly to the crank shaft 32, it will be evident that when the locking lever 56 is drawn against the two extension members 54 and 55 the crank shaft will be held against rotation. This drawing action is produced by a tension spring 59, the upper end of which is secured to a fixed standard bracket 60 and the lower end is secured to a movable crank arm 61, which is formed as a continuation of the bolt 58. The construction of this crank arm is more particularly shown in Fig. 5 of the drawing.

The manual operation of the lifting device may be produced by a lever 63. This lever is pivoted around the crank shaft 32 and carries a pawl 64 which may engage the teeth of the sprocket 35 and cause this sprocket to be rotated. The action will, of course, rotate the shaft 32 and result in oscillating the bell crank 28.

In operation the structure may be manually operated by repeatedly oscillating the arm 63 and successively causing the pawl 64 to engage the teeth of the gear 35 and draw the connecting rod 34. When mechanical operation of the lift is desired and power is to be exerted upon the lifting mechanism, the operator draws forwardly on the lever 41, as indicated by the arrow $a$ in Figs. 6 and 1. This forward drawn action will swing the lever 40 upwardly in the direction of the arrow $b$ and will result in swinging the radius 38 downwardly in the direction of the arrow $c$ in Fig. 1. As this bar swings downwardly it will bring the lower run of the chain 36 into mesh with the sprocket 39, and, as the plow is continuously advancing the rotary motion of the wheel 12 with its sprocket will be imparted to the chain 36 to produce a driving action in the direction of the arrow $d$, as indicated in Fig. 1. This driving action will rotate the sprocket 35 and the crank shaft 32. The rotary trip member 51 will then swing in the direction of the arrow $d$, as indicated in Fig. 1, and the lower cam of this trip member, as indicated at 53, will swing out of engagement with the trip pin 50 and permit a spring 70 to draw upwardly on the pin end of the pawl 48 and force the point of propulsion 47 into engagement with the serrated teeth 48 of the arcuate bracket 49. This action of the pawl will hold the radius bar in its lowermost position and the chain 36 in engagement with the sprocket. The sprocket chain will thus continue to move and cause the crank shaft 32 to rotate. As this crank shaft rotates the trip member 51 will also rotate to swing the lock lever 56 from its normal obstructing position, and, at the same time, to swing the crank extension of the shaft 32 so that a drawing action will be imparted to the rod 34. In the rear half of the cycle of the crank shaft 32 the bell crank 28 will be thrown rearwardly and in the forward half of this cycle the bell crank will be swung forwardly.

It will be recognized that the frame will be thus alternately raised and lowered upon the vertical portion 21 of the rear axle structure 20. Due to the fact that the cam faces 53 and 52 are upon diametrically opposite sides of their axis of rotation they will encounter the pin 50 of the pawl at each half cycle of the rotation of the shaft 32 and will thus release the radius arm when the lowering or raising operation has been completed. The release of the radius arm will cause the pawl 47 to swing upwardly and will permit the spring 44 to draw downwardly upon the lever 40 to move the radius arm upwardly and the sprocket chain away from the sprocket 39. At the instant of release the two extension members 54 and 55 will be resting against the side face of the lock member 56 and thus will hold the radius arm in an inoperative position due to the tension of the spring 59.

It will thus be seen that the device here disclosed may be easily mounted upon plows of common construction and will act in a semi-automatic manner to raise and lower the plow frame by the advancing movement of the plow itself and will act to automatically discontinue this raising or lowering movement at its completion.

It will be further evident that due to the fact that the crank 28 is disposed with its fulcrum point below the pivot point 27 any force tending to raise the plow disks during plowing will in reality act through the linkage to hold the plows in the ground. At this time the rod 34 will be locked by the lock bar 56 which is holding the crank arm 32 on dead center and thus preventing strain of the lifting mechanism.

While we have shown the preferred form of our invention, as now known to us, it will be understood that various changes in the combination, construction and arrangement of parts may be made by those skilled in the art, without departing from the spirit of the invention, as claimed.

Having thus described our invention, what we claim and desire to secure by Letters Patent is:

1. In combination with the running gear and frame of a plow, a driving sprocket connected to the running gear so as to be constantly driven thereby, a crank shaft, means connected to said shaft to raise and lower the frame in relation to the running gear, a radius bar pivoted on the shaft, a sprocket on the radius bar and a sprocket on the shaft, a chain connecting said sprockets and engageable with the sprocket of the running gear upon movement of the radius bar in one direction, means to hold the chain in operative relation to the driving sprocket and means to automatically release the chain from its said operative position upon completion of the raising or lowering movement.

2. In combination with the running gear and frame of a plow, driving means on the axle of the running gear, raising and lowering means, means between the raising and lowering means to raise and lower the frame in relation to the running gear, means to operate the raising and lowering means including an endless chain shiftable at will into engagement with the driving means, means to positively hold said shifting means against shifting movement, and means to automatically release said holding means upon completion of the raising or lowering movement.

3. In combination with the running gear and frame of a plow, a driving sprocket operated by the running gear, raising and lowering means having a sprocket, shifting means having a sprocket, an endless chain connected to the last named sprockets, and means to shift said shifting means to move the chain into engagement with the sprocket of the running gear.

4. In combination with the running gear and frame of a plow, driving means on the axle of the running gear, a crank shaft, means connected to the crank shaft to raise and lower the frame in relation to the running gear, means shiftable at will into engagement with the driving means to drive the crank shaft, means to hold the shiftable means against movement, and means carried by the crank shaft to release said holding means in both clockwise and counterclockwise movements of the crank shaft.

5. In combination with the running gear and frame of a plow, driving means operated by the running gear, a crank shaft, means connected to the crank shaft to raise and lower the frame in relation to the running gear, means shiftable into engagement with the driving means to drive the crank shaft, means to hold the shiftable means against movement, including a segmental rack and pawl, and a trip member centrally borne by the crank shaft and having each of its ends formed to engage and release the pawl.

6. In combination with the running gear and frame of a plow, driving means operated by the running gear, a crank shaft, means connected to the crank shaft to raise and lower the frame in relation to the running gear, means shiftable into engagement with the driving means to drive the crank shaft, means to hold the shiftable means against movement, including a segmental rack and pawl, a trip member connected centrally of its length to the crank shaft and having each of its ends formed to engage and release the pawl, and a lock engageable with the trip member to hold the crank shaft against movement and being released by the trip member.

7. In combination with the running gear and frame of a plow, driving means operated by the running gear, a crank shaft, means connected to the crank shaft to raise and lower the frame in relation to the running gear, means shiftable into engagement with the driving means to drive the crank shaft, means to hold the shiftable means against movement, means to hold the crank shaft against movement, and combined means to release the holding means of the shifting means and to move the holding means of the crank shaft to inoperative position.

8. In combination with the running gear and frame of a plow, driving means operated by the running gear, a crank shaft, means connected to the crank shaft to raise and lower the frame in relation to the running gear, means shiftable into engagement with the driving means to drive the crank shaft, means to hold the shiftable means against movement, tripping means borne by the crank shaft to release the crank shaft holding means, and means coöperating with the tripping means to hold the crank shaft against movement and being moved to inoperative position by and upon positive operation of the tripping means.

9. In combination with the running gear and frame of a plow, driving means on the axle of the running gear, means to raise and lower the frame with relation to the running gear, including an endless chain, means shiftable at will into engagement with the driving means to actuate the raising and lowering means, means to hold said shiftable means in engagement with the driving means, and means to release the holding means upon completion of the raising and lowering movement.

10. In combination with the running gear and frame of a plow, driving means operated by the running gear, means to raise and lower the frame with relation to the running gear, and means to actuate the raising and lowering means including an endless chain having a flight thereof shiftable into and out of engagement with the driving means.

11. In combination with the running gear and frame of a plow, driving means on the axle of the running gear, means to raise and lower the frame with relation to the running gear including a crank shaft, means between said shaft and driving means and including an endless chain shiftable at will into engagement with the driving means to drive the shaft from the driving means, means to hold said shifting means in engagement with the driving means, and carried by the shaft to release said holding means upon completion of the raising and lowering movement.

12. In combination with a plow frame and running gear therefor, a driving means on the axle of the running gear, a crank shaft, frame raising and lowering means connected to the shaft and means including an endless chain pivotally mounted on the shaft and shiftable at will into engagement with the driving means to actuate the shaft from the driving means.

In testimony whereof we have hereunto set our hands in the presence of two subscribing witnesses.

HORACE G. KNAPP.
ROBERT I. KNAPP.
ROBERT G. FLEMING.

Witnesses:
GEORGE LEAMAN,
H. M. FINNEMORE.